July 19, 1960 G. F. W. POWELL 2,945,497
DRIVING ARRANGEMENTS FOR THE TOBACCO HOPPERS
OF CIGARETTE-MAKING MACHINES
Filed May 15, 1957 4 Sheets-Sheet 1

INVENTOR
Gordon F. W. Powell
BY
Watson, Cole, Grindle & Watson
ATTORNEYS

July 19, 1960

G. F. W. POWELL 2,945,497

DRIVING ARRANGEMENTS FOR THE TOBACCO HOPPERS
OF CIGARETTE-MAKING MACHINES

Filed May 15, 1957

INVENTOR
Gordon F. W. Powell
BY
Watson, Cole, Grindle & Watson
ATTORNEYS

July 19, 1960 G. F. W. POWELL 2,945,497
DRIVING ARRANGEMENTS FOR THE TOBACCO HOPPERS
OF CIGARETTE-MAKING MACHINES
Filed May 15, 1957 4 Sheets-Sheet 4

INVENTOR
Gordon F. W. Powell
BY
Watson, Cole, Grindle + Watson
ATTORNEYS

United States Patent Office 2,945,497
Patented July 19, 1960

2,945,497

DRIVING ARRANGEMENTS FOR THE TOBACCO HOPPERS OF CIGARETTE-MAKING MACHINES

Gordon Francis Wellington Powell, Deptford, London, England, assignor to Molins Machine Company Limited, Deptford, London, England, a British company Filed May 15, 1957, Ser. No. 659,349

Claims priority, application Great Britain May 15, 1956

2 Claims. (Cl. 131—21)

This invention concerns improvements in driving arrangements for the tobacco hoppers of cigarette making machines.

It is common to control the speed of these hoppers by measuring devices which measure the mass of the product or partial product of the machine; for example, a loose filler or the cigarette rod passes through a radiation gauge or an electrostatic detector, or the separate cigarettes may be measured by such devices, or by direct weighing, but in all cases the measuring device is associated with an electrical controlling circuit which controls or operates suitable mechanism for altering the speed of the hopper. When the measured mass is incorrect the hopper speed is adjusted, the hopper mechanism being driven for this purpose through a variable speed gear.

According to the present invention there is provided in a cigarette making machine of the class having a measuring device which measures the mass of the product or partial product of the machine and an electrical controlling circuit associated with said measuring device and mechanism for altering the speed of the hopper controlled or operated by said electrical circuit, hopper driving mechanism comprising a stepless variable gear variable over a suitable range of speeds, a regulating device for said gear, an electric motor coupled to the regulating device for altering the ratio of said gear in response to currents in the controlling circuit and a slippable clutch interposed between the motor and the gear regulating device.

The stepless variable gear is preferably the gear described and illustrated in British Patent No. 618,774, dated January 29, 1946, in which driving and driven wheels of the gear are coupled by a ring of balls engaging said members the balls being mounted for rotation on axles whose angular disposition with respect to the common axis of the driving and driven wheels of the gear can be altered by the adjusting device of the gear whereby the gear ratio between one wheel and a ball and between the other wheel and the same ball can be altered for the purpose of varying the ratio of input and output speeds of the gear.

A handwheel may be attached to the gear regulating device so that the gear ratio can be altered manually, the said clutch slipping to permit this.

One form of the invention will be described with reference to the accompanying drawings in which.

Figure 4:
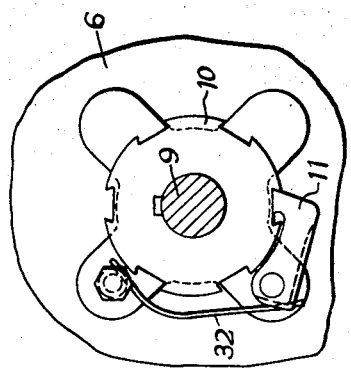
Figure 4 is a fragmentary view in the direction of the arrow A, Figure 1.

Referring to the drawings, 1 is part of the bed of a cigarette making machine and on its rear side is fixed a gearbox 2 associated with the main driving arrangements of the machine and having a shaft 3 projecting from it on which is fixed a V-belt pulley 4. A belt 5 transmits the drive to a larger V-pulley 6. This pulley is freely mounted on a bush 7 and the latter is freely mounted on a sleeve 8 keyed to a shaft 9. The sleeve 8 is actually the hub of a ratchet wheel 10 and a pawl 11 pivoted on the pulley 6, as better seen in Figure 4, is normally engaged with the ratchet wheel. Thus when the shaft 3 rotates, the shaft 9 is also rotated. This shaft is the input shaft of a variable speed gear housed in a casing 12. The gear shown in the drawings is described in detail in British Patent No. 618,774, dated January 29, 1946, and is sold in Great Britain as the "Kopp Variator" while in the United States it is sold by The Cleveland Worm and Gear Company as the "Cleveland Variator." It is admirably suited to the purpose as its output speed is steplessly variable over a range wide enough for cigarette machine hopper drive control.

Figure 2:
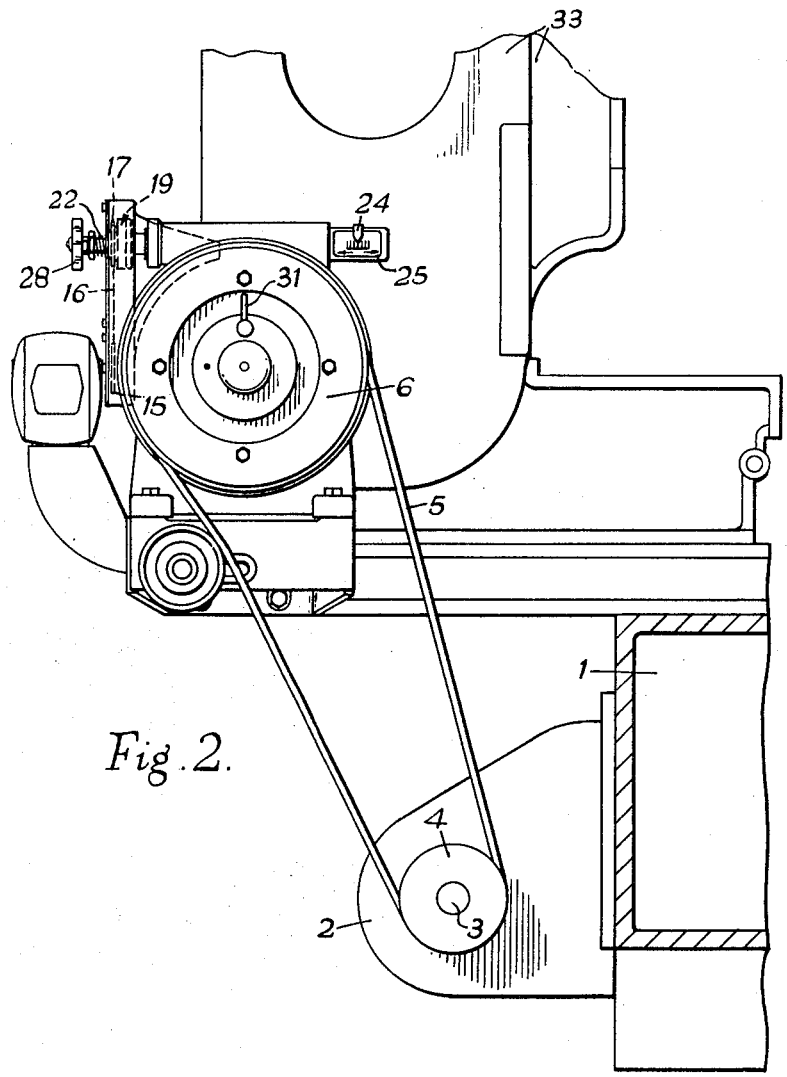
Figure 2 is a side elevation of Figure 1, also partly in section.
Figure 3:
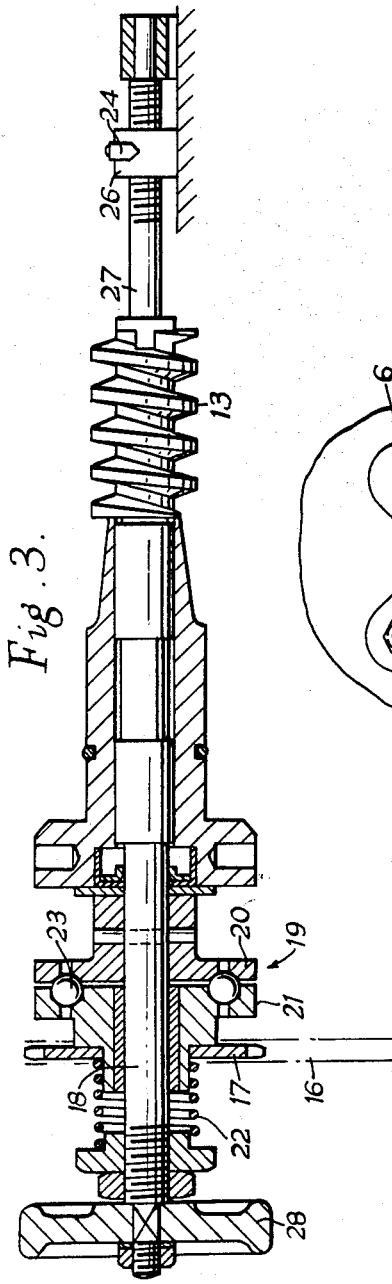
Figure 3 is a sectional elevation of a shaft shown in Figure 2.

The gear is adjusted to vary its output speed by a worm 13, Figure 3. For automatic adjustment there is provided a reversible electric motor 14 provided on its shaft with a sprocket wheel 15, Figure 2, which sprocket wheel is connected by a chain 16, see also Figure 3, to a sprocket wheel 17 on a shaft 18 which is integral with the worm 13.

Figure 5:
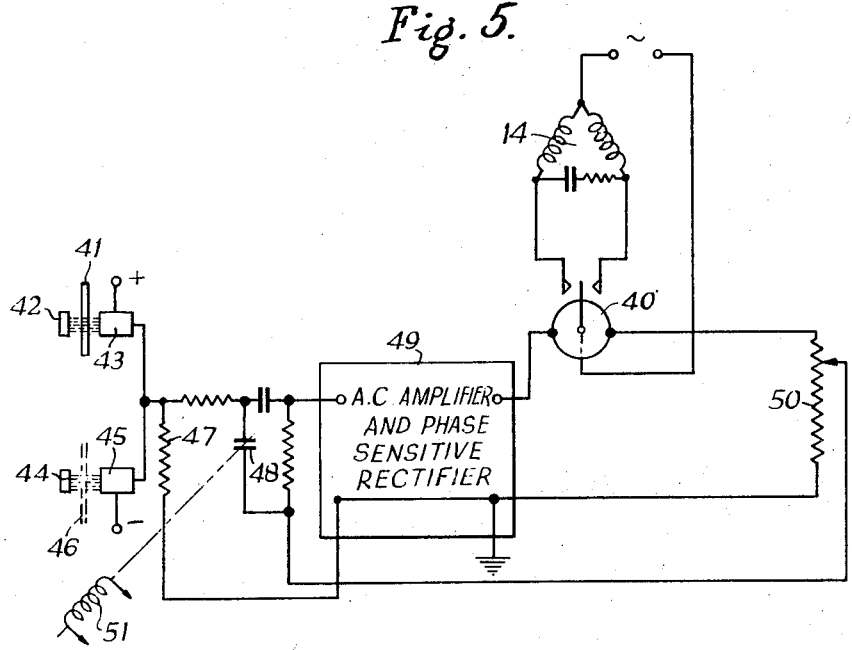
Figure 5 is a diagram of a control circuit for an electric motor used in the machine of Figure 1.

The motor 14 is switched on and off to drive it in the necessary direction by any suitable relay or like device in the controlling electric circuit. A diagram showing the basic elements of a suitable control circuit is given in Figure 5 where the motor 14, which is a reversible A.C. motor, is controlled by a relay 40. In the figure, 41 represents a cigarette rod which is measured by a radiation gauge comprising a radioactive source 42 and an ionization chamber 43. Another gauge having a source 44 and chamber 45 acts in the usual way as a balancer having an absorber 46 whose absorption is equal to that of a cigarette rod of the desired mass. The chambers are connected in opposition so that the resulting current depends on any difference in the mass of the rod from its desired value. The current difference develops a D.C. voltage across an input resistor 47 which voltage is converted to A.C. by a dynamic condenser 48. This A.C. voltage is amplified and converted back to D.C. by an amplifier and a phase sensitive rectifier indicated by a block diagram 49 and fed to the relay 40 and thence to a feedback resistor 50 from which the output current is fed back to the lower end of the dynamic condenser 48 to oppose the voltage produced by the input current. An A.C. drive for the condenser 48 is indicated at 51.

It has been stated above that the variable speed gear in casing 12 is stepless within a certain range and in order to avoid any risk of injury to the mechanism the shaft 18 is coupled to the sprocket wheel through a clutch generally indicated by the reference 19. This clutch comprises a disc 20 pinned to the shaft 18 and another disc 21 fixed to the sprocket wheel 17 but free on the shaft 18. A spring 22 presses the disc 21 towards the disc 20 and between the discs there are driving elements consisting of balls 23 normally resting in cup shaped recesses in the discs. The clutch is strong enough for normal driving of the worm 13 but when the variable speed gear reaches either end of its adjustment the clutch breaks.

An indicator is fitted to show the range of movement of the adjusting device of the variable speed gear, this indicator consisting of a pointer 24 movable over a scale 25, see Figure 2. The pointer is connected to a nut 26 movable on a screw 27 fixed to the worm 13, Figure 3.

It is often desired to make a change in the speed of the hopper (overriding the automatic speed control) while the machine is running, if for some reason the tobacco feeding rate is obviously inadequate or excessive, for example, when the machine is first started. This is effected in the present case by a handwheel 28 fixed to the shaft 18. This handwheel may be turned either way and the clutch 19 will break while this is being done so that the variable speed gear is altered without any reaction on the motor 14 and its drive to the shaft 18.

Figure 1:
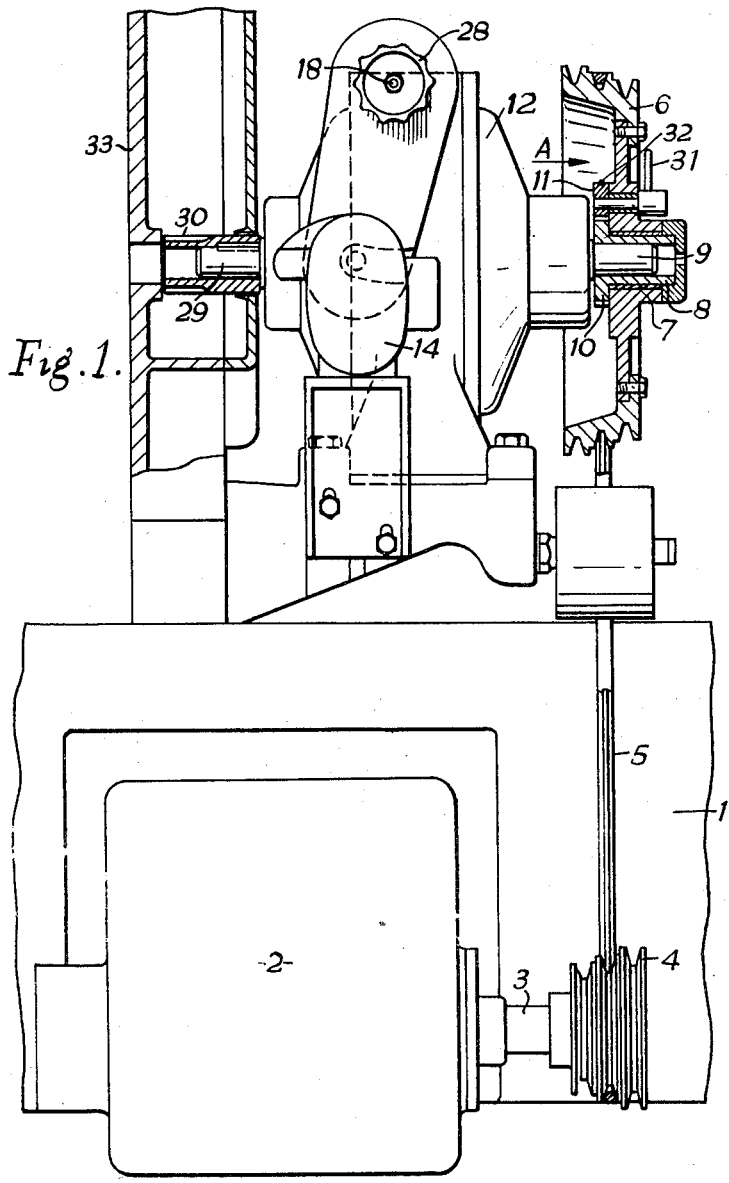
Figure 1 is a view of part of a cigarette making machine showing part of the hopper casing, the view being partly in section.

The output shaft of the variable speed gear is shown at 29, Figure 1, and on it there is fixed a gear pinion 30. This pinion is the driver of all the mechanism of the tobacco hopper and the nature of said mechanism will of course depend on the particular design of hopper and it is therefore not shown. One side of the hopper is shown at 33.

It is sometimes desired for testing purposes to run the rod making part of the machine alone, that is, all the mechanism except the tobacco hopper. For this purpose the pawl 11 is provided with a handle 31 whereby it may be turned out of its driving position. This can be best understood from Figure 4 where it will be seen that the spring 32 which controls the pawl can act as a dead centre spring to hold the pawl out of engagement with the ratchet wheel if the pawl is turned by said handle about 70° clockwise in that figure.

What I claim as my invention and desire to secure by Letters Patent is:

1. In a cigarette making machine of the class having a radiation gauge which measures the mass of the tobacco filler produced by the machine and mechanism for altering the speed of the hopper to cause more, or less tobacco to be fed to form the filler, said mechanism being operated by a motor in an electrical controlling circuit associated with and controlled by said gauge, the combination with hopper driving mechanism comprising a stepless variable ratio drive gear, of a regulating device for altering the ratio of said gear and coupled to said motor whereby the ratio of the gear is altered in response to currents in the controlling circuit, a slippable clutch interposed between the motor and the regulating device, and a handwheel attached to said device whereby the gear ratio can be altered manually to alter the tobacco feed rate and override the gauge control, said clutch slipping to permit such manual regulation.

2. Hopper driving mechanism as claimed in claim 1 wherein the variable drive gear is coupled to its driving device through a ratchet wheel and pawl device the pawl whereof is arranged to be manually disengaged from the ratchet wheel whereby the mechanism of the cigarette machine other than the hopper may be driven while the hopper remains still.

References Cited in the file of this patent
UNITED STATES PATENTS

| | | |
|---|---|---|
| 1,864,728 | Hawkins et al. | June 28, 1932 |
| 2,519,089 | Whitaker | Aug. 15, 1950 |
| 2,683,362 | Bowman | July 13, 1954 |
| 2,732,746 | Livermont | Jan. 31, 1956 |